(12) United States Patent
Long

(10) Patent No.: US 11,644,190 B1
(45) Date of Patent: May 9, 2023

(54) LED DECORATIVE LAMP

(71) Applicant: Dan Long, Shenzhen (CN)

(72) Inventor: Dan Long, Shenzhen (CN)

( * ) Notice: Subject to any disclaimer, the term of this patent is extended or adjusted under 35 U.S.C. 154(b) by 0 days.

(21) Appl. No.: 17/701,314

(22) Filed: Mar. 22, 2022

(51) Int. Cl.
| | |
|---|---|
| *F21L 4/02* | (2006.01) |
| *F21V 23/00* | (2015.01) |
| *F21V 23/04* | (2006.01) |
| *F21L 4/08* | (2006.01) |
| *F21L 19/00* | (2006.01) |
| *H05B 45/325* | (2020.01) |
| *F21Y 115/10* | (2016.01) |

(52) U.S. Cl.
CPC .............. *F21V 23/009* (2013.01); *F21L 4/02* (2013.01); *F21L 4/08* (2013.01); *F21L 19/00* (2013.01); *F21V 23/04* (2013.01); *H05B 45/325* (2020.01); *F21Y 2115/10* (2016.08)

(58) Field of Classification Search
CPC ... F21L 19/00; F21L 4/027; F21L 4/08; F21L 4/02; F21V 23/03; F21V 23/04; F21V 23/06; F21V 23/003; F21W 2121/00; F21Y 2107/50
See application file for complete search history.

(56) References Cited

U.S. PATENT DOCUMENTS

| | | | | |
|---|---|---|---|---|
| 6,688,752 B2 * | 2/2004 | Moore | ...................... | F21S 10/04 |
| | | | | 315/200 A |
| 9,200,767 B2 * | 12/2015 | Katsaros | .............. | F21V 21/0832 |
| 9,303,824 B2 * | 4/2016 | Sun | ........................... | F21K 9/23 |
| 9,689,544 B2 * | 6/2017 | Green, Jr. | .............. | H05B 45/10 |
| 10,344,930 B1 * | 7/2019 | Mitchell, Jr. | .............. | F21K 9/23 |
| 10,436,401 B2 * | 10/2019 | Lee | ............. | G09G 3/32 |
| 10,941,914 B1 * | 3/2021 | Hollinger | ................ | F21S 9/037 |
| 10,989,380 B2 * | 4/2021 | Patton | .................... | F21S 10/043 |
| 11,125,418 B2 * | 9/2021 | Freeland | .................... | F21S 9/03 |
| 2005/0146874 A1 * | 7/2005 | Cech | ....................... | F21S 8/081 |
| | | | | 362/253 |
| 2006/0279956 A1 * | 12/2006 | Richmond | .............. | F21V 15/01 |
| | | | | 362/803 |
| 2009/0067197 A1 | 3/2009 | Shao | | |
| 2011/0075404 A1 | 3/2011 | Allen | | |
| 2015/0036325 A1 * | 2/2015 | Cohen | ..................... | F21S 9/037 |
| | | | | 362/124 |
| 2019/0353317 A1 * | 11/2019 | Chang | .................... | F21S 10/043 |

FOREIGN PATENT DOCUMENTS

| | | |
|---|---|---|
| CN | 207880622 U | 9/2018 |
| CN | 214790870 U | 11/2021 |

\* cited by examiner

*Primary Examiner* — Ismael Negron

(57) ABSTRACT

A decorative lamp includes a base; at least three LED circuit boards, a plurality of LED lamp beads distributed on an outer surface of each LED circuit board; a main control board electrically connected with the LED circuit boards and having a controller configured to send a timing signal; a driving power electrically connected with the main control board and having a PWM driving circuit electrically connected with the LED circuit boards, for receiving the timing signal sent by the controller and outputting a PWM signal according to the received timing signal; and a hollow lampshade surrounding the LED circuit boards and the main control board.

7 Claims, 4 Drawing Sheets

LED DECORATIVE LAMP

TECHNICAL FIELD

The present invention belongs to the field of lighting lamp technologies, and more particularly, relates to a 3D LED luminous decorative lamp.

BACKGROUND

With the development of technology, there are more and more applications of LED, the colorful lighting of LED street lamps, courtyard lamps and other flood lamps may make squares, courtyards and other places more lively, and different colors may bring different rendering effects to the surrounding environment.

In the prior art, a single LED lamp panel is generally used as a light source in a LED luminous decorative lamp, and due to planar LED distribution of the single LED lamp panel, a display effect of the single-panel planar LED lamp is also planar, so that a 3D luminous effect cannot be achieved. On the other hand, a luminous pattern of the existing LED luminous decorative lamp is usually fixed, and it is difficult to adjust the luminous pattern and the luminous effect according to actual needs, leading to poor user experience.

SUMMARY

The present invention aims to provide a 3D LED luminous decorative lamp to solve the technical problems in the prior art that a LED lamp cannot achieve a 3D luminous effect, a luminous pattern is relatively single, and it is difficult to adjust the luminous pattern and the luminous effect. The technical solutions used in the present invention to solve the technical problems are as follows.

A 3D LED luminous decorative lamp comprises:

a base;

a LED circuit board mounted on the base, wherein at least three LED circuit boards are provided, and a plurality of LED lamp beads are distributed on an outer surface of each LED circuit board;

a main control board electrically connected with the LED circuit boards, wherein the main control board and the LED circuit boards form a light source of the decorative lamp, the main control board at least comprises a controller, and the controller is configured to send a timing signal;

a driving power electrically connected with the main control board, wherein the driving power comprises a PWM driving circuit, the PWM driving circuit is electrically connected with the LED circuit boards, the PWM driving circuit is capable of being used for receiving the timing signal sent by the controller, and outputting a PWM signal according to the received timing signal, so that lighting and flashing of the LED lamp beads are controlled, and required patterns and effects are formed through lighted LED lamp beads; and, a lampshade, wherein an interior of the lampshade is hollow, and the LED circuit boards and the main control board are located in the lampshade.

The technical solutions further used in the present invention are as follows. Three LED circuit boards are provided, inner surfaces of every two adjacent LED circuit boards form an included angle of 60° with each other, when the LED lamp beads are in an operating state, the lighted LED lamp beads located on upper portions of the LED circuit boards are arranged in a wave shape, the lighted LED lamp beads located on middle and lower portions of the LED circuit boards are arranged in a rectangle shape, the lighted LED lamp beads on the upper portions form a flame shape, and the lighted LED lamp beads on the middle and lower portions form a fire body.

Further, the PWM driving circuit comprises a PWM modulation circuit and an IC driving unit, the PWM modulation circuit is electrically connected with the controller, and the IC driving unit is electrically connected with the PWM modulation circuit and the LED lamp beads respectively.

Further, the decorative lamp comprises a battery and a switch assembly, wherein the battery and the switch assembly are mounted on the base, the switch assembly consists of a switch and a switch PCB board, and the switch PCB board is electrically connected with the main control board.

Further, the base is provided with a plurality of fixed columns.

Further, the decorative lamp comprises a light-transmitting member, wherein the light-transmitting member is covered outside the lampshade.

Further, the light-transmitting member is made of a milky white material, the light-transmitting member is fixed on the base through a bolt, and light rays emitted by the LED lamp beads pass through the light-transmitting member to form a soft and natural luminous effect.

Further, the decorative lamp comprises a housing and a bottom plate, wherein the light-transmitting member is accommodated in the housing, the bottom plate is mounted on a bottom portion of the housing, and the bottom plate is capable of being penetrated by the switch.

Further, the decorative lamp comprises a solar panel and a baffle, wherein the baffle is fixed on a top portion of a housing, the solar panel is mounted on the baffle, and the solar panel is capable of converting solar energy into electric energy, and providing a power for a battery.

Further, the decorative lamp further comprises a handle, wherein the handle is mounted on two sides of an upper portion of the housing, and the handle is detachable.

According to the first technical solution of the present invention, at least three LED circuit boards are used in the present invention, every two adjacent LED circuit boards are closely connected, the LED lamp beads are distributed on the outer surface of each LED circuit board as the light source of the decorative lamp, and luminous surfaces of the LED circuit boards are independent from each other, thus forming a stereoscopic 3D luminous effect.

According to the second technical solution of the present invention, the controller sends the timing signal to the PWM driving circuit of the main control board in the present invention, and the PWM driving circuit outputs the corresponding PWM signal according to the received timing signal, so that lighting and flashing of the LED lamp beads are controlled, and required patterns and effects are formed through lighted LED lamp beads.

According to the third technical solution of the present invention, by setting the switch assembly, a user may toggle the switch to adjust the luminous effect and the luminous pattern of the lamp, after the switch is powered on for the first time, a fire mode is preferably selected when MCU detects a voltage, after the switch is continuously powered on for the second time with a time interval kept for 1 second, a second mode of constant lighting is switched, after the switch is continuously powered on for the third time with a time interval kept for 1 second, a third mode of in-turn flashing of the luminous surfaces is switched, and after the switch is continuously powered on for the fourth time with a time interval kept for 1 second, a fourth mode of spiral and upward flashing is switched.

Figure 1:
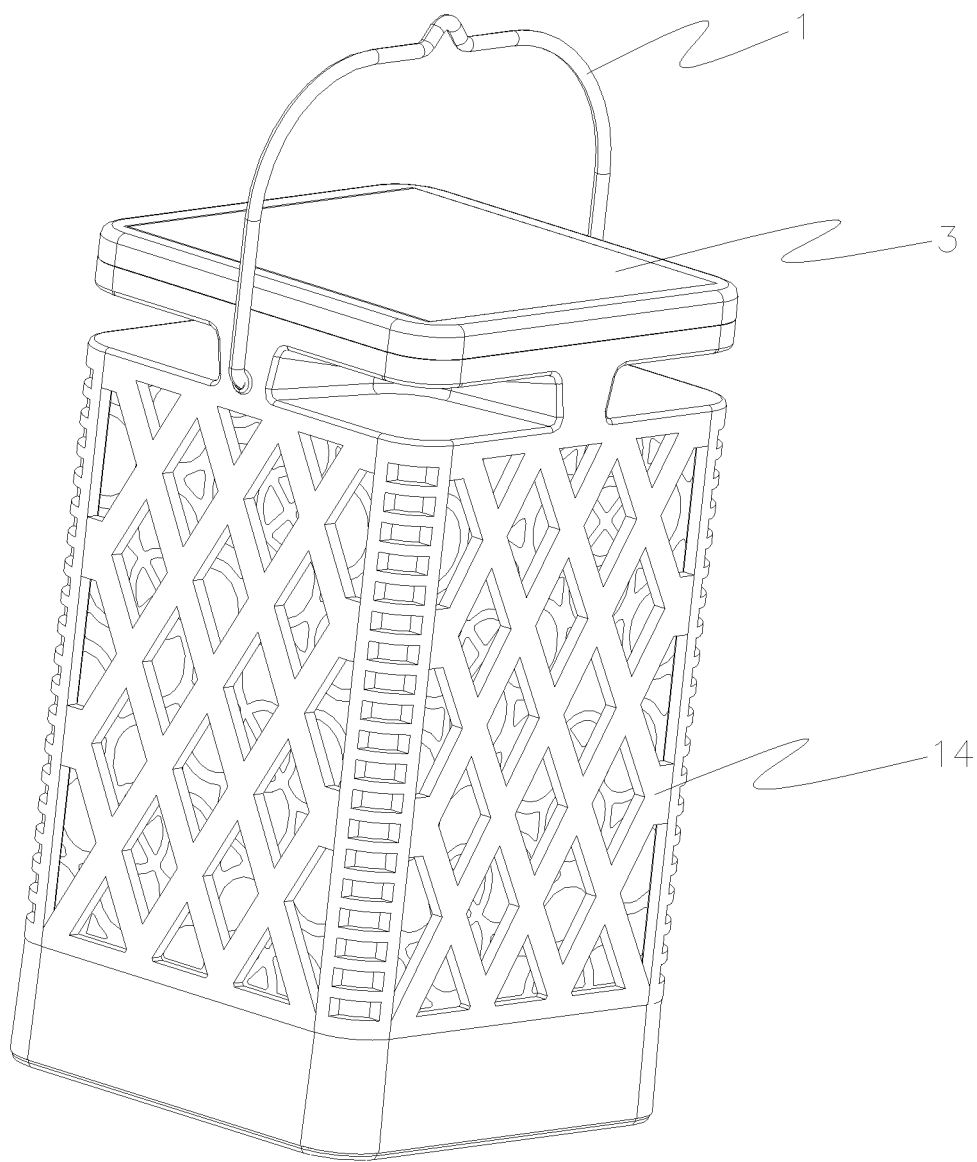
FIG. 1 is a schematic stereoscopic structure diagram of a decorative lamp according to an embodiment of the present invention.

1 refers to handle, 2 refers to baffle, 3 refers to solar panel, 4 refers to main control board, 5 refers to lampshade, 6 refers to LED circuit board, 601 refers to LED lamp bead, 7 refers to switch PCB board, 8 refers to switch, 9 refers to bolt, 10 refers to battery, 11 refers to base, 1101 refers to fixed column, 12 refers to bottom plate, 13 refers to light-transmitting member, and 14 refers to housing.

DETAILED DESCRIPTION

In order to make the above objects, features and advantages of the present invention clearer and more understandable, the specific embodiments of the present invention are described in detail hereinafter with reference to the drawings. In the following description, many specific details are explained so as to fully understand the present invention. However, the present invention can be implemented in many other ways different from those described herein, and those skilled in the art can make similar improvements without violating the connotation of the present invention, so that the present invention is not limited by the specific embodiments disclosed below.

In the description of the present invention, it should be understood that the orientation or position relationship indicated by the terms "center", "longitudinal", "transverse", "length", "width", "thickness", "up", "down", "front", "rear", "left", "right", "vertical", "horizontal", "top", "bottom", "inside", "outside", "clockwise", "anticlockwise", "axial", "radial", "circumferential", and the like is based on the orientation or position relationship shown in the drawings, it is only for the convenience of description of the present invention and simplification of the description, and it is not to indicate or imply that the indicated device or element must have a specific orientation, and be constructed and operated in a specific orientation. Therefore, the terms should not be understood as limiting the present invention.

Moreover, the terms "first" and "second" are used for descriptive purposes only and cannot be understood as indicating or implying relative importance, or implicitly indicating the number of technical features indicated thereby. Thus, the feature defined by "first" and "second" may explicitly or implicitly comprise at least one feature. In the description of the present invention, the meaning of "multiple" is at least two, such as two, three, and so on, unless otherwise specifically defined.

Figure 2:
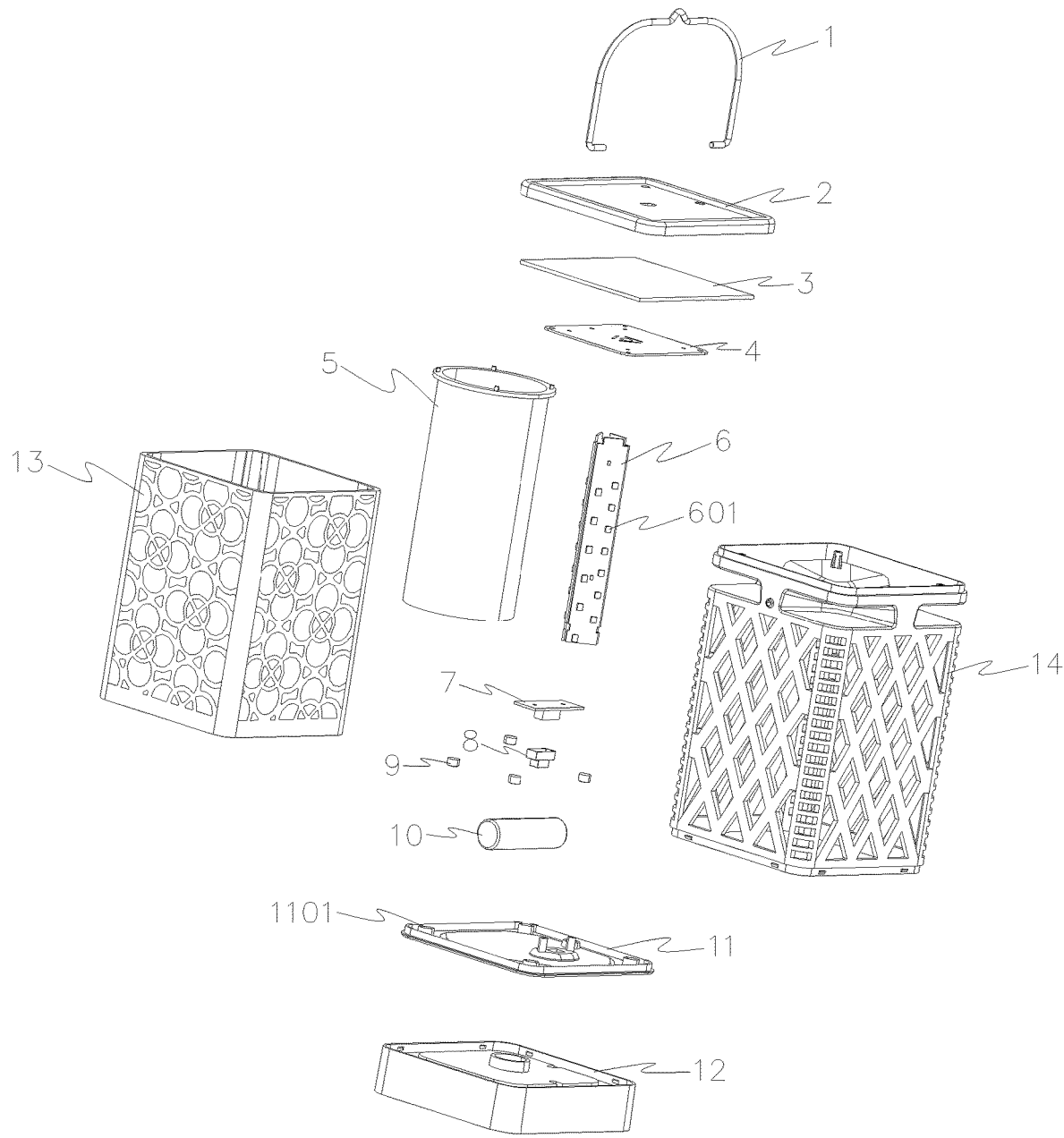
FIG. 2 is an exploded view of the decorative lamp according to the embodiment of the present invention.

With reference to FIG. 1 to FIG. 4, the embodiment provides a 3D LED luminous decorative lamp, which comprises:

a base 11, wherein the base 11 is used as a foundation support of the decorative lamp, and may be used for bearing other components of the decorative lamp;

a LED circuit board 6 mounted on the base 11, wherein at least three LED circuit boards 6 are provided, a plurality of LED lamp beads 601 are distributed on an outer surface of each LED circuit board 6, as shown in FIG. 2, there are three LED circuit boards 6 in total, every two adjacent LED circuit boards 6 are closely connected, and since the LED lamp beads 601 on the outer surface of each LED circuit board 6 are independent from each other, the decorative lamp of the present invention may form a stereoscopic 3D luminous effect;

a main control board 4, wherein the main control board 4 is electrically connected with the LED circuit boards 6, the main control board 4 and the LED circuit boards 6 form a light source of the decorative lamp, the main control board 4 at least comprises a controller (not shown in the drawings), and the controller is configured to send a timing signal;

a driving power (not shown in the drawings) electrically connected with the main control board 4, wherein the driving power comprises a PWM driving circuit (not shown in the drawings), the PWM driving circuit is electrically connected with the LED circuit boards 6, the PWM driving circuit is capable of being used for receiving the timing signal sent by the controller, and outputting a PWM signal according to the received timing signal, so that lighting and flashing of the LED lamp beads 601 are controlled, and required patterns and effects are formed through lighted LED lamp beads 601; and, a lampshade 5, wherein an interior of the lampshade 5 is hollow, the LED circuit boards 6 and the main control board 4 are located in the lampshade 5, and the lampshade 5 is capable of being used for protecting the LED circuit boards 6 and the main control board 4.

With reference to FIG. 2, in a specific embodiment, three LED circuit boards 6 are provided, and inner surfaces of every two adjacent LED circuit boards 6 form an included angle of 60° with each other. Taking the decorative lamp showing a simulated fire effect as an example, when the LED lamp beads 601 are in an operating state, the lighted LED lamp beads 601 located on upper portions of the LED circuit boards 6 are arranged in a wave shape, and the lighted LED lamp beads 601 located on middle and lower portions of the LED circuit boards 6 are arranged in a rectangle shape, wherein the lighted LED lamp beads 601 on the upper portions form a flame shape, and the lighted LED lamp beads 601 on the middle and lower portions form a fire body, thus achieving a luminous effect simulating fire. In the embodiment, the LED circuit boards 6 are three-face LED circuit boards, and those skilled in the art may understand that four, five or more LED circuit boards 6 may also be provided as long as a stereoscopic 3D luminous effect can be ensured, which is not limited herein. A user may preset various other types of patterns, such as animal and plant patterns, character images and cartoon images, according to use needs, and the patterns are called out when in use, thus greatly enriching rendering effects of the decorative lamp.

The PWM driving circuit preferably comprises a PWM modulation circuit (not shown in the drawings) and an IC driving unit (not shown in the drawings), the PWM modulation circuit is electrically connected with the controller, and the IC driving unit is electrically connected with the PWM modulation circuit and the LED lamp beads 601 respectively. The PWM modulation circuit may be used for modulating the PWM signal generated by the PWM driving circuit to obtain a better luminous effect, and the IC driving unit may be used for detecting operating conditions of the LED lamp beads 601, and controlling the lighting and flashing of the LED lamp beads 601, thus ensuring normal operating states of the LED lamp beads 601.

Figure 3:
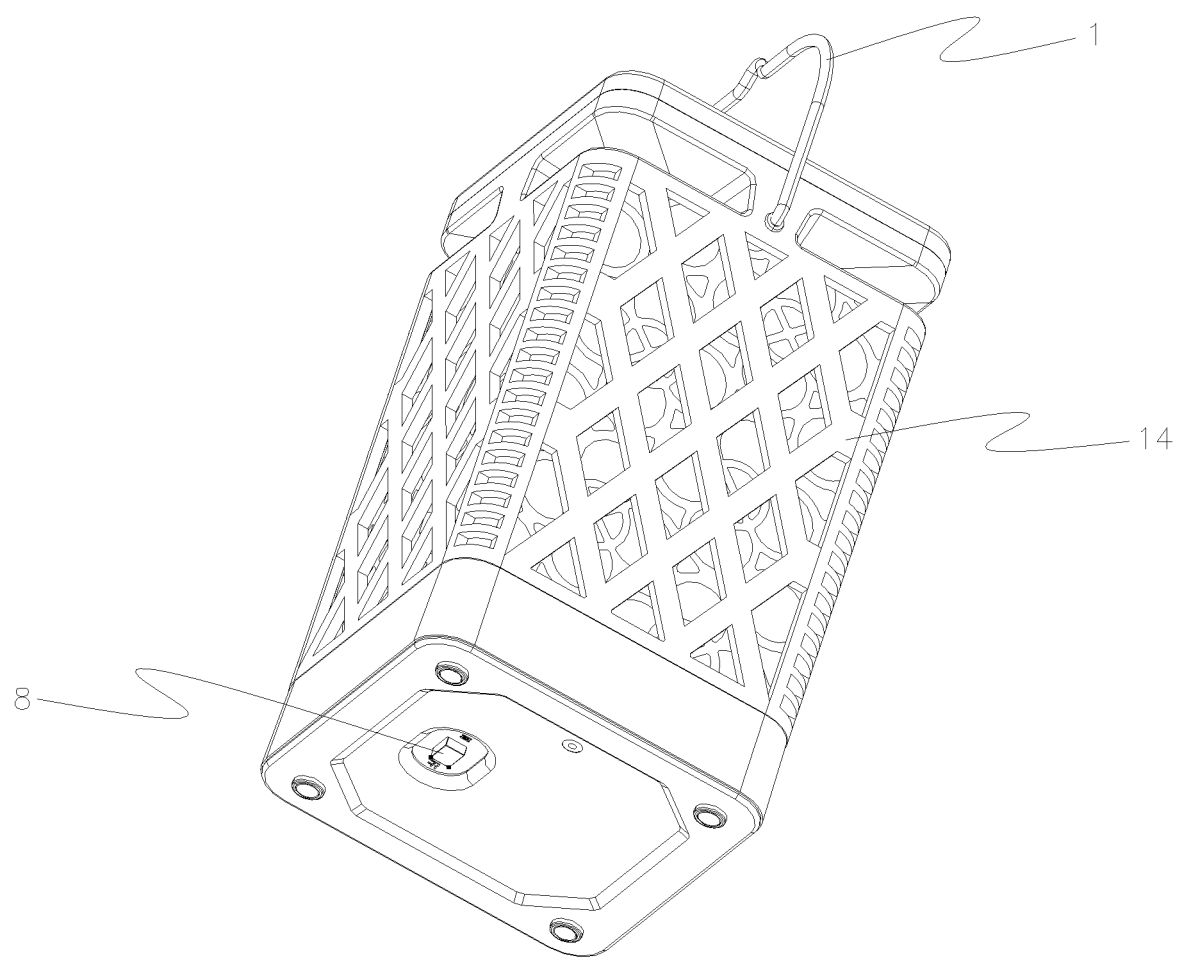
FIG. 3 is a schematic stereoscopic structure diagram of the decorative lamp according to the embodiment of the present invention along another direction.
Figure 4:
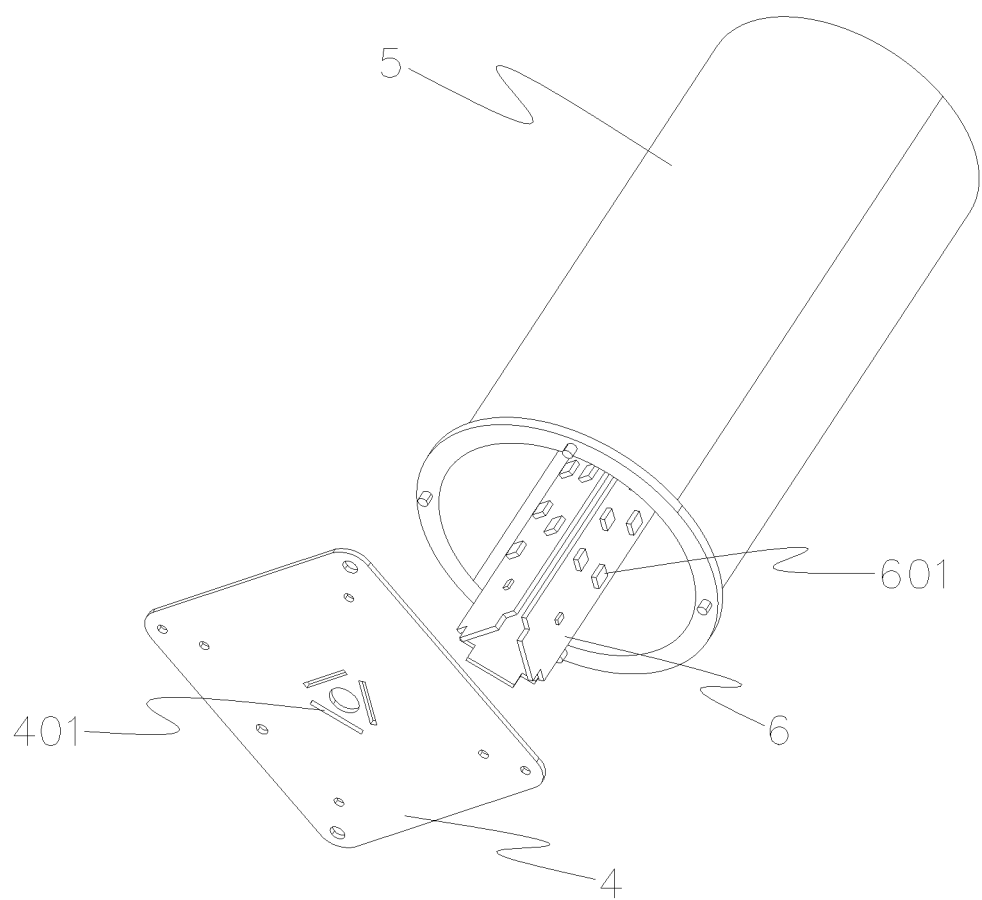
FIG. 4 is a schematic assembly structure diagram of LED circuit boards, a main control board and a lampshade in the embodiment of the present invention.

As shown in FIG. 2 and FIG. 3, the decorative lamp comprises a battery 10 and a switch assembly, and the battery 10 and the switch assembly are mounted on the base 11, wherein the switch assembly consists of a switch 8 and a switch PCB board 7, and the switch PCB board 7 is electrically connected with the main control board 4. When the user toggles the switch 8, the switch PCB board 7 detects a position and a state of the switch 8, and transmits the position and the state to the main control board 4, thus achieving the purpose of controlling the operating states of the LED lamp beads 601 by toggling the switch 8.

With reference to FIG. 2, the base 11 is provided with a plurality of fixed columns 1101. More specifically, there are four fixed columns 1101 in total, which are distributed at four corners of the base 11, and the fixed columns 1101 may be used for fixing the base 11 and a light-transmitting member 13.

The decorative lamp further comprises the light-transmitting member 13. As shown in FIG. 2, the light-transmitting member 13 is covered outside the lampshade 5. In a specific embodiment, the lampshade 5 is a cylinder, and the light-transmitting member 13 is a cuboid with openings at upper and lower ends. Preferably, the light-transmitting member 13 is made of a milky white material, the light-transmitting member 13 is fixed on the base 11 through a bolt 9, and light rays emitted by the LED lamp beads 601 pass through the light-transmitting member 13 to form a soft and natural luminous effect.

In some embodiments, the decorative lamp comprises a housing 14 and a bottom plate 12. As shown in FIG. 2 and FIG. 3, the light-transmitting member 13 is accommodated in the housing 14, the bottom plate 12 is mounted on a bottom portion of the housing 14, and the bottom plate 12 is capable of being penetrated by the switch 8.

In some embodiments, the decorative lamp comprises a solar panel 3 and a baffle 2. As shown in FIG. 1 and FIG. 2, the baffle 2 is fixed on a top portion of the housing 14, the solar panel 3 is mounted on the baffle 2, and the solar panel 3 is capable of converting solar energy into electric energy, and providing a power for the battery 10. The decorative lamp may detect a surrounding illumination intensity through a light control detection circuit. When the illumination intensity is higher than a preset value, it is in the daytime, the solar panel 3 is charged through sunlight, and the lamp is not operated at the moment. When the illumination intensity is lower than the preset value, it is in the night, the solar panel 3 releases the stored electric energy to provide power for the battery 10, and the lamp enters a normal operating state. In the embodiment, the battery 10 is a rechargeable battery, such as a rechargeable lithium ion battery.

In other embodiments, the decorative lamp further comprises a handle 1, wherein the handle 1 is mounted on two sides of an upper portion of the housing 14, and the handle 1 is preferably detachable. The user may move the decorative lamp or hang the decorative lamp for use through the handle 1.

Operating principles of the present invention are approximately as follows. A prestored luminous pattern is selected first, and when in use, the user may toggle the switch to adjust the luminous effect and the luminous pattern of the lamp. For example, the switch is toggled to the left to a first gear after the switch is powered on for the first time, and a fire mode is preferably selected when MCU detects a voltage; when the switch is toggled to the left to a second gear, it is indicated that the switch is continuously powered on for the second time with a time interval kept for 1 second, and a second mode of constant lighting is switched at the moment; when the switch is toggled to the right to a third gear, it is indicated that the switch is continuously powered on for the third time with a time interval kept for 1 second, and a third mode of in-turn flashing of the luminous surfaces is switched at the moment; and when the switch is toggled to the right to a fourth gear, it is indicated that the switch is continuously powered on for the fourth time with a time interval kept for 1 second, and a fourth mode of spiral and upward flashing is switched at the moment.

At least three LED circuit boards are used in the present invention, every two adjacent LED circuit boards are closely connected, the LED lamp beads are distributed on the outer surface of each LED circuit board as the light source of the decorative lamp, and luminous surfaces of the LED circuit boards are independent from each other, thus forming a stereoscopic 3D luminous effect. The controller sends the timing signal to the PWM driving circuit of the main control board in the present invention, and the PWM driving circuit outputs the corresponding PWM signal according to the received timing signal, so that lighting and flashing of the LED lamp beads are controlled, and required patterns and effects are formed through lighted LED lamp beads. By setting the switch assembly, the user may toggle the switch to adjust the luminous effect and the luminous pattern of the lamp, after the switch is powered on for the first time, a fire mode is preferably selected when MCU detects a voltage, after the switch is continuously powered on for the second time with a time interval kept for 1 second, a second mode of constant lighting is switched, after the switch is continuously powered on for the third time with a time interval kept for 1 second, a third mode of in-turn flashing of the luminous surfaces is switched, and after the switch is continuously powered on for the fourth time with a time interval kept for 1 second, a fourth mode of spiral and upward flashing is switched.

The above embodiments only express several embodiments of the present invention, and the descriptions thereof are specific and detailed, but they cannot be understood as limiting the scope of protection of the present invention. It shall be pointed out that those of ordinary skills in the art may further make several modifications and improvements without departing from the concept of the present invention, and these modifications and improvements all fall within the scope of protection of the present invention. Therefore, the scope of protection of the present invention shall be subject to the appended claims.

The invention claimed is:

1. A 3D luminous decorative lamp, comprising:
  a base;
  at least three circuit boards;
  a plurality of LED lamp beads distributed on an outer surface of each of the LED circuit boards;
  a main control board electrically connected to the LED circuit boards to control the plurality of LED lamp beads to form lighting and flashing patterns and effects, wherein the main control board and the LED circuit boards form a light source of the decorative lamp;
  a hollow lamp shade accommodating the LED circuit boards and the main control board;
  a battery;

a switch assembly including a switch and switch circuit board electrically connected with the main control board; and a plurality of fixed columns provided in the base, wherein the battery and the switch assembly are mounted on the base.

2. The decorative lamp according to claim 1, wherein inner surfaces of every two adjacent LED circuit boards form an included angle of 60° with each other, and the LED lamp beads are arranged in upper, middle and lower portions on each of the LED circuit boards, each portion configured to be individually activated to form different lighting patterns.

3. The decorative lamp according to claim 1, further comprising:

a housing;

a baffle fixed on a top portion of the housing; and a solar panel mounted on the baffle, and configured to convert solar energy into electric energy for charging the battery.

4. The decorative lamp according to claim 3, further comprising a detachable handle attached at two sides of the top portion of the housing.

5. The decorative lamp according to claim 1, further comprising a light-transmitting member covering the lampshade.

6. The decorative lamp according to claim 5, further comprising a bolt fixing the light-transmitting member to the base, wherein the light-transmitting member is made of a milky white material, and light rays emitted by the LED lamp beads pass through the light-transmitting member.

7. The decorative lamp according to claim 5, comprising:

a housing accommodating the light-transmitting member; and a bottom plate mounted on a bottom portion of the housing, wherein the switch extends through the bottom plate.

* * * * *